United States Patent Office 3,361,811
Patented Jan. 2, 1968

3,361,811
PREPARATION OF β-PERCHLOROMETHYL ACID CHLORIDES
Kryn G. Ihrman, Oak Park, Allen H. Filbey, Walled Lake, and Edward F. Zaweski, Oak Park, Mich., assignors to Ethyl Corporation, New York, N.Y., a corporation of Virginia
No Drawing. Filed Oct. 16, 1963, Ser. No. 316,503
22 Claims. (Cl. 260—544)

ABSTRACT OF THE DISCLOSURE

Group VIII metals catalyze the preparation of β-perchloromethyl carboxylic acid halides from olefins, carbon monoxide, and carbon tetrachloride. For example, palladium catalyzes the formation of β-perchloromethyl propionyl chloride from ethylene carbon monoxide and carbon tetrachloride.

---

This invention relates to a novel process for the preparation of carboxylic acids and their derivatives. More particularly, it relates to a process for the preparation of β-perchloromethyl acid chlorides and other carboxy compounds derived therefrom.

Acid halides, particularly acid chlorides, are very useful as chemical intermediates. Their importance maintains a continuing interest in the development of new and improved processes for their preparation.

We have discovered a simple, economic catalytic process for the preparation of acid chlorides. One outstanding feature of our process is that it requires considerably less than a molar equivalent quantity of catalyst. Moreover, our process does not destroy the catalyst; hence, the catalysts are reusable.

Furthermore, the catalysts employed in our process are stable and relatively non-toxic. Hence, they can be stored and used without elaborate safety precautions.

Our catalysts are solids and can be readily dispersed upon an inert support. Therefore, our process can be effectively carried out as a continuous flow operation.

Moreover, both the catalysts and reactants employed in our process are relatively inexpensive and readily obtainable. Furthermore, our products are very useful as chemical intermediates since they contain two reactive functional groups.

An object of this invention is to provide a process for the preparation of bifunctional compounds from an olefin. Another object is to provide a process for the preparation of acid halides. A particular object is to provide a catalytic method of preparation of β-perchloromethyl acid chlorides. Additional objects will be apparent from the following detailed description and appended claims.

The objects of this invention are accomplished by providing a process for the preparation of β-perchloromethyl acid chlorides which comprises reacting an olefin with carbon monoxide and carbon tetrachloride in the presence of a catalytic amount of a Group VIII metal.

Depending upon the isolation procedure employed, β-perchloromethyl acid chlorides or derivatives thereof are obtained. For example, if the reaction mixture containing the acid chloride is treated with water or alcohol, the corresponding carboxylic acid or an ester thereof is prepared. Amides are produced by treating the acid chloride with ammonia. Other procedures for modifying the acid chloride are apparent to one skilled in the art.

Hence, in a process for the preparation of carboxylic acids, carboxylic acid halides, esters, amides and the like, we employ a step comprising reacting an olefin with carbon monoxide and carbon tetrachloride in the presence of a catalytic amount of a Group VIII metal. This reaction can be illustrated by the following equation wherein the olefin employed is ethylene and M represents a Group VIII metal.

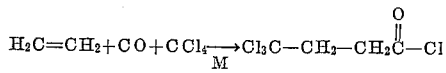

The reaction can be carried out as a liquid-gas phase operation or as a vapor phase process.

As illustrated by the equation, two carbon atoms are added to the olefin used in the process. These carbon atoms are within two functional groups; viz, the carbonyl chloride and perchloromethyl radicals. Hence, our products are bifunctional. Their bifunctionality renders them especially valuable as chemical intermediates. Since two carbon atoms are added to the olefin, our method is directed to the preparation of carboxylic acids and derivatives thereof having at least four carbon atoms.

As illustrated by the equation, one molecule each of carbon monoxide and carbon tetrachloride combine with each double bond reacted. Although the process of this invention can be carried out by using the reactants in this ratio, it is not necessary to do so. We frequently employ other ratios. For example, when the reaction is to be carried out in the presence of a liquid phase, we frequently employ an excess of carbon tetrachloride. The excess acts as a solvent and dispersing medium. The amount of excess is not critical and is governed to some extent by equipment design, solubility of the products and other reactants, and ease of separation of the desired product. Thus, up to 30 or 40 or more moles of carbon tetrachloride per mole of olefin can be employed, if desired.

We have found that an excess of carbon monoxide frequently increases the yield. Hence, we usually use from about 1.5 to about 15 moles of carbon monoxide per mole of double bond to be reacted. Preferably, we employ from about 2 to about 12 moles and most preferably from about 3 to about 10 moles of carbon monoxide per mole of double bond.

Thus, if the olefin is a monoolefin, we most preferably employ from about 3 to about 10 moles of carbon monoxide per mole of olefin. Similarly, if the olefin is a diolefin, we preferably employ from about 6 to about 20 moles of carbon monoxide per mole of olefin.

Our process can be carried out in the presence of inert ingredients. For example, it can be carried out in the presence of a solvent and/or dispersing medium which does not enter into the reaction. Preferably, the solvent-dispersing medium is an inert organic liquid such as an ether, hydrocarbon, or mixture thereof, typical ethers which can be employed are either cyclic or straight-chain ethers such as tetrahydrofuran, dioxane, dimethoxy-ethane, diethyleneglycol dimethylether and the like. Hydrocarbons which can be employed can be either aliphatic or aromatic. Typical applicable hydrocarbons are cyclohexane, benzene, toluene, isooctane, No. 9 oil, kerosene, petroleum ether and the like.

Our process is conducted at a reaction temperature within the range of from about 100° to about 300° C. A preferred temperature range is from about 110° to about 180° C. Highly preferred temperatures are within the range of 125° to 160° C.

Our process is carried out under elevated pressures. We employ pressures within the range of from about 100 to about 10,000 p.s.i. Preferred pressures are within the range of from about 200 to about 8,000 p.s.i. Pressures within the range of from about 500 to about 6,000 p.s.i. are highly preferred.

The reaction time required by our process is not a truly independent variable and is dependent to some extent on the nature of the olefin and the products and upon other process variables under which the reaction is conducted. For example, when high pressures and high temperatures are used, the reaction time is usually reduced. Similarly, low temperature and low pressures usually require a longer reaction time. In general, we use a reaction time within the range of from about 2 to 48 hours.

When the reaction is carried out in the presence of a liquid phase, we prefer to agitate the reaction mixture. Agitation is not essential, but is preferred since it affords a smooth reaction rate and tends to increase the rate of reaction. When the reaction is to be carried out as a continuous vapor-phase process, we frequently disperse the catalyst (in a first state of division) on an inert matrix.

Our products are isolated from the reaction mixture by methods known in the art. For example, the products can be isolated by distillation, extraction, fractional crystallization, salting out, chromatography and other similar methods.

Our process can be carried out in an ordinary steel pressure vessel. Gold and silver plated and glass-lined vessels can be employed if desired. However, their use is not critical.

The catalyst employed in our process can be any Group VIII metal or a mixture thereof. Iron subgroup metals (iron, ruthenium and osmium), cobalt subgroup metals (cobalt, rhodium and iridium), and nickel subgroup metals (nickel, palladium and platinum) are applicable. Preferred metals are those within the iron and nickel subgroup. Highly preferred metals are iron, palladium and platinum. For best results, the metal is employed in a fine state of subdivision. Metal turnings and metal powders are preferred. The metal can also be dispersed and supported on an inert matrix such as charcoal, alumina, diatomaceous earth, bentonite, firebrick, kaolin, ground glass, silicon carbide and the like.

The reaction is conducted in the presence of a catalytic amount of the Group VIII metal which is usually up to about 20 mole percent. Amounts as low as 0.0001 mole percent can be used, but usually larger amounts in the range of 0.01–5 mole percent are employed.

A wide variety of olefins are applicable in our process. For example, alpha-olefins (or in other words, alkenes having a double bond in a terminal position) are applicable. The simplest olefin, ethylene, is a member of this class. Homologs of ethylene comprise the other members of this class and have the generic formula $R^1—CH=CH_2$.

The radical $R^1$ may be selected from a wide variety of hydrocarbon radicals. The exact nature and configuration of the radical is not critical provided that the radical is not so bulky as to greatly reduce the rate of reaction by steric hindrance.

Typically, $R^1$ is an alkyl radical. Illustrative but not limiting olefins are propylene, butene-1, hexene-1, octene-1, and decene-1. It is not necessary that the olefin have a straight chain; all the various positional isomers of the illustrative compounds (and their homologs) are applicable provided that the radical has the requisite stability and does not seriously hinder the process. Hence, olefins such as 3-methyl-1-butene, 6-ethyl-1-nonene, 4,4-dipropyl-1-hexene, and the like are applicable. The variety of olefins of this class that are applicable demonstrates that the process of this invention is substantially a reaction involving the olefinic linkage and the radical $R^1$ is not involved in the reaction to an appreciable extent.

The radical $R^1$ can comprise an alicyclic ring. For example, when one mole of 4-cyclohexyl-1-butene is contacted with one mole of carbon tetrachloride and 30 moles of carbon monoxide, in the presence of 7 grams of two percent palladium on charcoal, at a temperature of 125° C. and under a pressure of 3,000 p.s.i.g., the product is a mixture comprising 3-perchloromethyl-5-cyclohexylvaleryl chloride and 2-[2,2,2-trichloroethyl]-4-cyclohexylbutyryl chloride. Under similar conditions, except that 10 grams of hydrogen-reduced iron is used in place of palladium on charcoal, 4-cyclopentyl-1-pentene yields a mixture of 2-perchloromethyl-5-cyclopentylcaproyl chloride and 2-[2,2,2-trichloroethyl]-5-cyclopentylvaleryl chloride.

$R^1$ can also be a phenyl radical or a substituted derivative thereof. Illustrative but not limiting examples of olefins of this type are styrene, p-methylphenylethylene, o-xylyl ethylene and the like. For example, when styrene is reacted under conditions similar to those employed with cyclohexyl butene, the product, is a mixture of 2-phenyl-3-perchloromethylpropionyl chloride and 3-phenyl-3-perchloromethylpropionyl chloride. Under similar conditions and in the presence of 5 percent iridium or firebrick, methylstyrene yields a mixture of 2-methyl-3-perchloromethyl-3-phenylpropionyl chloride and 2-phenyl-3-perchloromethylbutyryl chloride.

Moreover, $R^1$ can be an aralakyl radical such as the β-phenylethyl radical or the benzyl radical or the like. Thus, when 4-phneyl-1-butene is reacted under conditions similar to those employed with cyclopentylpentene, noted above, and in the presence of iron on charcoal, the product is a mixture of 3-perchloromethyl-5-phenylvaleryl chloride and 2-[2,2,2-trichloroethyl] - 4 - phenylbutyryl chloride.

$R^1$ may also contain one or more double bonds. In other words, diolefins and olefins having three or more double bonds are applicable in the instant process. Under some conditions, the double bonds in a 1,3-diolefin may not react to yield a diacyl chloride but may undergo a so-called 1,4-addition. For example, 1,3-butadiene can react under the conditions employed in the instant process to yield

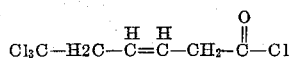

Diolefins containing isolated double bonds, i.e., $R^1$ is

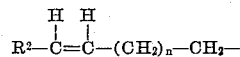

wherein $n=1, 2, 3 \ldots$, and $R^2$=hydrogen or a hydrocarbon radical, react in a normal fashion to yield diacyl chlorides. Preferred polyolefins are cyclic polyolefins of the type described and illustrated below.

When $R^2$ in the above formula is a hydrocarbon radical or in olefins having the generic formula

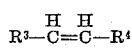

wherein $R^3$ and $R^4$ are hydrocarbon radicals having from one to about five carbon atoms, the olefin has an internal double bond, that is a double bond not in a terminal position. These olefins are also applicable in the instant process. The double bonds in some internal olefins may migrate during the course of the instant process, however, the product obtained is a β-perchloromethyl acyl chloride.

Non-aromatic cyclic olefins are also applicable in the instant process. Illustrative but not limiting examples of cyclic olefins which react according to the process of this invention are cyclohexene, 1,3-cyclohexadiene, norbornadiene, dicyclopentadiene, and 1,5-cyclooctadiene and the like. For example, whne cyclohexene is reacted with carbon tetrachloride and carbon monoxide in the presence of iron, the product is the compound illustrated below.

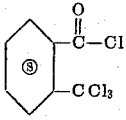

The cyclic olefins can be substituted with hydrocarbon radicals having from one to about five carbon atoms. It is preferred that the number of carbon atoms in these substituted olefins does not exceed about twelve. For example, 3-pentylcyclohexene, 4-methylcyclohexadiene-1,3, 7,7-diethylnorbornadiene and 3,4,7,8-tetramethylcyclooctadiene-1,5 are applicable in the instant process.

Olefins having the formula:

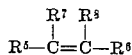

wherein $R^5$, $R^6$, $R^7$, and $R^8$ are hydrocarbon radicals, are applicable provided that the radicals are stable under the process conditions employed and the reaction is not sterically hindered. Hence, tetramethylethylene and 2,3-dimethylpentene-2 react (under conditions similar to those employed with cyclopentylpentene) with carbon monoxide and carbon tetrachloride to yield 2,2,3,3-tetramethyl-4,4,4-trichlorobutyryl chloride and a mixture of 2,3-dimethyl-2-ethyl-3-perchloromethylbutyryl chloride and 2-methyl-3-perchloromethylvaleryl chloride respectively.

In summary, stable olefins having from 2 to about 12 carbon atoms are preferred in the process of this invention. An olefin is stable if the organic radicals bonded to the olefinic carbon atoms are not destroyed during the process. In other words, the preferred organic radicals are not altered by an extraneous or competitive side reaction and the acid halide product must be stable in the resultant reaction mixture to a significant degree. Furthermore, the organic radical or radicals attached to the doubly bonded carbon atoms must not prevent the formation of the desired product by reacting with the process reactants.

Moreover, the olefin must not contain a radical which is so bulky as to unduly retard the process by steric hindrance. In other words, the double bond must be unhindered.

Applicable olefinic linkages are those which are not incorporated with an aromatic system. In other words, applicable double bonds are present within an aliphatic or alicyclic radical. However, as discussed above, applicable olefins include those which contain an aromatic side chain bonded to one or more of the double bonded aliphatic or alicyclic carbon atoms.

Non-conjugated aliphatic straight-chain olefins which contain a double bond in a terminal position, cyclic monoolefins and cyclic diolefins which meet the above criteria are preferred. Examples of these preferred olefins are ethylene, propylene, butene-1, cyclohexene, dicyclopentadiene, norbornadiene, 1,5-cyclooctadiene, cyclononene, cyclodecene, α-pinene, β-pinene and the like. Highly preferred olefins are the straight-chain alpha-olefins having 2 to 6 carbon atoms and the cyclic olefins illustrated above. The most preferred straight-chain olefins are ethylene and propylene.

The following examples further illustrate our process. All parts are by weight unless otherwise designated.

*Example 1*

A gold plated autoclave equipped with stirring means was charged with 2 parts of hydrogen-reduced iron and 960 parts of carbon tetrachloride. The autoclave was then flushed twice with carbon monoxide and the stirrer activated. The autoclave was then pressured to 350 p.s.i.g. with ethylene. The pressure was then increased to 1,050 p.s.i.g. with carbon monoxide. The temperature was raised to 140° C. At this temperature the pressure was 1200 p.s.i.g. Additional ethylene, 350 p.s.i.g., was added followed by 450 p.s.i.g. of additional carbon monoxide. The reaction mixture was maintained at 140° C. for two and one-half hours. The temperature was raised to 150° C. and kept there for an additional two and one-half hours. The autoclave was then cooled and vented.

The reaction mixture was filtered and the residue washed twice with carbon tetrachloride. The washings were combined with the filtrate. The residue was then extracted with diethylether and filtered. This filtrate was combined with the previous filtrate and washings. The combined filtrates and washings were made basic with 25 percent sodium hydroxide and stirred for about three hours. The basic layer was separated from the neutral layer. The neutral layer was dried over anhydrous magnesium sulfate and the solvent removed under vacuum. Fifty-six parts of a neutral fraction was obtained.

The basic layer was acidified with hydrochloric acid using Congo red as an indicator. The acidified material was then extracted with diethylether. The ether solution was then dried and the ether removed by distillation under vacuum. β-Trichloromethyl propionic acid, 120 parts, was obtained. The infrared spectrum was identical to the spectrum of an authentic sample of β-trichloromethyl propionic acid.

A similar reaction was carried out in the absence of hydrogen-reduced iron. No other Group VIII metal was added. Only 14 parts of β-trichloromethyl propionic acid was obtained. This yield is approximately one-eighth of the yield obtained when hydrogen-reduced iron was employed, illustrating the catalytic activity of a Group VIII metal.

*Example II*

Carbon monoxide, ethylene and carbon tetrachloride are reacted as in Example I except that powdered palladium metal is employed in place of hydrogen-reduced iron. The resultant reaction mixture is filtered and the filtrate is transferred to a suitable reaction vessel. Ammonia gas is bubbled through the filtrate for three hours.

A white precipitate of ammonium chloride is formed. The resultant mixture is heated to the boiling point and filtered while hot. The filtrate is reduced to one-half the original volume by distillation. Petroleum ether is then added and a precipitate is formed. Additional petroleum ether is added until precipitation is complete. The precipitate is β-trichloromethyl propionamide.

*Example III*

A stainless steel pressure vessel equipped with stirring means is charged with 10 parts of powdered platinum metal and 1200 parts of carbon tetrachloride. While stirring, a total of 500 p.s.i.g. of ethylene and 6,000 p.s.i.g. of carbon monoxide are introduced into the vessel. The contents of the vessel are stirred and the reaction mixture maintained at 100° C. for 48 hours. The vessel is then cooled, vented and discharged.

The resultant reaction mixture is filtered to remove the solid platinum-containing residues. The filtrate is stirred with 140 parts of ethanol for two hours. Ethyl β-trichloromethyl propionate is obtained by fractionally distilling the resultant mixture.

The platinum-containing residues and 1200 parts of carbon tetrachloride are charged to the pressure vessel. The vessel is then pressured with a total of 5000 p.s.i.g. of ethylene and 6000 p.s.i.g. of carbon monoxide. The contents of the vessel are stirred and the reaction mixture maintained at 100° C. for 48 hours. The vessel is then cooled, vented and discharged. Treatment of the reaction mixture with ethanol as above results in the formation of additional ethyl β-trichloromethyl propionate.

*Example IV*

A glass lined rocking autoclave was charged with 80 parts of carbon tetrachloride and two parts of 5 percent palladium on charcoal. The autoclave was then flushed with ethylene and then pressured with 100 p.s.i.g. of ethylene. The pressure was increased to 1000 p.s.i.g. with carbon monoxide. The rocking mechanism was activated and the temperature increased to 138° C. At that temperature the pressure was 1300 p.s.i.g. The pressure was raised to 3500 p.s.i.g. with carbon monoxide and then to 4000 p.s.i.g. with ethylene. After three and one-half hours the pressure had decreased to 3700 p.s.i.g. and was increased to 4000 p.s.i.g. with additional carbon monoxide. After 40 minutes the pressure had decreased to 3985 p.s.i.g. Additional ethylene was added to increase the pressure to 4200 p.s.i.g. The pressure remained essentially constant for 55 minutes. After that time the vessel was cooled and vented.

The liquid contents were discharged to a suitable reaction vessel and treated as in Example I. β-Perchloromethyl propionic acid, 21.8 parts, was obtained. A neutral fraction, 2.8 parts, was also isolated.

A similar reaction was carried out in the absence of a Group VIII metal. Only 2.8 parts of β-perchloromethyl propionic acid was obtained.

Example V

A stainless steel autoclave equipped with stirring means was charged with 10 parts of five percent palladium on charcoal, 376 parts of carbon tetrachloride and 66 parts of benzene. The autoclave was flushed with carbon monoxide and then 14 parts of ethylene was added using a gas buret. The stirring mechanism was activated and after equilibrium had been reached, the pressure in the vessel was 135 p.s.i.g. The autoclave wac heated to 125° C. and an additional 28 parts of ethylene was added. The pressure increased to 420 p.s.i.g. Carbon monoxide was added with stirring until a pressure of 920 p.s.i.g. was attained. The reaction mixture was heated at 125° C. for 12 hours. During this period additional carbon monoxide was added to maintain the pressure between 730 and 1000 p.s.i.g. At the end of the reaction period the pressure vessel was cooled, vented and discharged.

The reaction mixture was filtered and the filtrate was charged into a suitable reaction vessel and treated as in Example I. β-Perchloromethyl propionic acid, 100 parts, was obtained. The neutral fraction amounted to 33 parts.

Example VI

A stainless steel pressure vessel equipped with stirring means was charged with 757 parts of carbon tetrachloride, 132 parts of benzene, and 1 part of ruthenium as 5 percent ruthenium on alumina. The stirrer was activated and the autoclave was flushed twice with carbon monoxide. The pressure was increased to 2000 p.s.i.g. with carbon monoxide. The temperature was increased to 125° C. and additional carbon monoxide was added to raise the pressure to 5000 p.s.i.g. The pressure was increased to 5500 p.s.i.g. with ethylene and the mixture was allowed to react for 6 hours and 35 minutes. After cooling and venting, the resultant liquid was treated as in Example I. β-Perchloromethyl propionic acid, 115 parts, and a neutral fraction, 5 parts, were isolated.

The reaction was repeated except that 1 part of platinum as 5 percent platinum on asbestos was employed. The mixture was allowed to react at 155° C. for 17 hours. After treating the liquid obtained by filtering the reaction mixture as in Example I, 298.3 parts of β-perchloromethyl propionic acid and 12.7 parts of a neutral fraction were obtained.

The reaction was repeated except that one part of palladium as 5 percent palladium on alumina was employed. The mixture was allowed to react at 125° C. for 6 hours and 26 minutes. Treating the resultant liquid as in Example I yielded 120.5 parts of β-perchloromethyl propionic acid and 14.7 parts of a neutral fraction.

Example VII

Carbon tetrachloride, carbon monoxide and ethylene are reacted as in Example VI except that tetrahydrofuran is employed in place of benzene. The catalyst employed is rhodium supported on bentonite. β-Perchloromethyl propionic acid is obtained.

The reaction is repeated using the following catalysts: iron on charcoal, ruthenium on alumina, osmium on diatomaceous earth, iridium on bentonite, rhodium on firebrick, palladium on kaolin, nickel on ground glass, cobalt on silicon carbide, platinum on charcoal, and palladium on bentonite. In each instance, β-perchloromethyl propionic acid is obtained.

Similar results are obtained when mesitylene, hexane and ethyl acetate are employed as a solvent-dispersing medium.

Example VIII

A glass lined stainless steel reaction tube approximately 50 cm. in length is packed with silicon carbide beads having three percent by weight of palladium dispersed thereon. A thermocouple is placed in the packing and attached to temperature indicating means outside of the reaction tube. The tube is connected to suitable heating means.

An inlet tube is fitted to the reaction tube. The inlet tube is connected to an ethylene source and a source of carbon monoxide saturated with carbon tetrachloride. The inlet tube is fitted with pressure indicating means downstream from the gas sources.

The downstream end of the reaction tube is fitted with discharge means connected to a heat exchanger. The heat exchanger is connected to a receiving vessel. The receiving vessel is fitted with a vent to release the unreacted gases. The vessel is also fitted with a product outlet.

Means for heating the ethylene and a flow metering device are located between the ethylene source and the inlet tube. The source of carbon monoxide saturated with carbon tetrachloride is a system comprising from the upstream termination thereof, a container of carbon monoxide under pressure fitted with outlet means, means for heating the stream of carbon monoxide, a pressure regulating valve, a vessel containing carbon tetrachloride fitted with inlet and outlet means, and a flow metering device.

The reaction tube is heated to 300° C. The flow of carbon monoxide and ethylene is initiated and the gases are heated to 300° C. The heated carbon monoxide is lead into the vessel containing the carbon tetrachloride through the inlet means of said vessel. The carbon monoxide is bubbled through the carbon tetrachloride in the vessel and is discharged through the vessel's outlet means. This process substantially saturates the carbon monoxide with carbon tetrachloride. The relative amounts of the ethylene and the carbon monoxide saturated with carbon tetrachloride are regulated by adjusting the flow metering devices, so that an approximately equivalent amount of carbon tetrachloride and ethylene are introduced into the reaction tube.

During the passage of the gases through the reaction tube, β-perchloromethyl propionyl chloride is formed. This product and the unreacted gases leave the reaction tube and enter the heat exchanger whereby the product is liquified. The liquid product and the unreacted gases then pass to the receiving vessel. The unreacted gases are vented from the receiving vessel. At intervals, the liquid product is removed from the receiving vessel via the product outlet.

Example IX

A glass lined, 250 ml. pressure vessel is charged with 160 parts of carbon tetrachloride and 1 gram of 5 percent palladium on charcoal. The vessel is flushed twice with carbon monoxide and then closed. The vessel is heated to 100° C. and then ethylene is admitted to raise the pressure to 50 p.s.i.g. Carbon monoxide is then introduced to increase the pressure to 100 p.s.i.g. The contents of the vessel are allowed to react for 48 hours.

During the course of the reaction, the pressure is maintained between 90 and 100 p.s.i.g. by adding sufficient gas to increase the pressure to 100 p.s.i.g. after the pressure has decreased to 90 p.s.i.g. The gas employed to recharge the pressure vessel is a 5:1 mixture of carbon monoxide to ethylene. After the reaction period the vessel is cooled, vented, and the resultant liquid is treated as in Example I. β-Perchloromethyl propionic acid is obtained.

Example X

A stainless steel autoclave is charged with 757 parts of carbon tetrachloride, 132 parts of benzene and 1 part of iridium as 5 percent iridium on charcoal. The liquid mixture is stirred and the autoclave flushed twice with carbon monoxide. The pressure is increased to 2000 p.s.i.g. with carbon monoxide. The temperature is increased to 125° C. and additional carbon monoxide is added to raise the temperature to 9100 p.s.i.g. The pressure is increased to 10,000 p.s.i.g. with ethylene and the mixture allowed to react for three hours. After cooling and venting, the reaction mixture is filtered and the filtrate is treated as in Example I. β-Perchloromethyl propionic acid is obtained.

*Example XI*

The process of Example X is repeated except that after the temperature is increased to 125° C., carbon monoxide is added to raise the pressure to 5400 p.s.i.g. The pressure is then increased to 6000 p.s.i.g. with ethylene. β-Perchloromethyl propionic acid is isolated from the reaction mixture.

*Example XII*

A 5000 pound autoclave is charged with 2.5 moles of carbon tetrachloride, 2.5 moles of octene-1 and 0.022 gram atom of palladium metal powder. The vessel is flushed with nitrogen and pressured to 1000 p.s.i.g. at 15° C. with carbon monoxide. The temperature is elevated to 140° C. and the autoclave repressured to 4700 p.s.i.g. with carbon monoxide. The reaction mixture is maintained at 148° C. for about two hours. The autoclave is then cooled, vented and discharged. The discharged contents are filtered and a 100 ml. aliquot of filtrate is made basic with 25 percent potassium hydroxide. The basic aqueous layer is separated.

The aqueous layer is acidified with 6 N hydrochloric acid and then extracted with ether. The ether layer is separated and the ether removed therefrom by evaporation. The residue is refluxed for two hours with 160 parts of methanol saturated with hydrogen chloride. A mixture of methyl β-perchloromethyl pelargonate and methyl 2-[2,2,2-trichloroethyl]-octanoate is obtained by fractionally distilling the reaction mixture.

The ester mixture is reacted with 45 parts of concentrated sulfuric acid at 100° C. for 3 hours. The reaction mixture is then poured into 200 parts of ice water. The aqueous solution is continuously extracted with ether for two days.

Evaporation of the ether yields n-hexylsuccinic acid.

The above example illustrates one method of employing the products of this invention as chemical intermediates. Treatment of the perchloromethyl group with concentrated sulfuric acid yielded a carboxylic acid radical, —COOH.

Employing a process similar to the above, ethylene is converted to succinic acid, butene-1 to ethyl succinic acid, hexene-1 to butyl succinic acid. Cyclohexene yields 1,2-cyclohexane dicarboxylic acid. The acids are valuable intermediates. For example, dehydration of the succinic acids produced by this process yields the corresponding succinic anhydrides.

The succinic acids can also be reacted with ammonia to form the corresponding diamides. Heating these compounds forms the corresponding succinimide. Treatment of the succinimide with bromine and sodium hydroxide in the cold yields the corresponding N-bromosuccinimide. These compounds are valuable brominating agents.

We have discovered that the process of this invention can be catalyzed by the iron-containing walls of steel pressure vessels if the reaction is carried out above about 150° C. The following example illustrates this embodiment of our invention.

*Example XIII*

A stainless steel pressure vessel equipped with stirring means was charged with 757 parts of carbon tetrachloride. The stirrer was activated and the autoclave was flushed twice with carbon monoxide. The pressure was increased to 2000 p.s.i.g. with carbon monoxide. The temperature was increased to 150° C. and additional carbon monoxide was added to raise the pressure to 5000 p.s.i.g. The pressure was increased to 5500 p.s.i.g. with ethylene and the mixture allowed to react for six hours and 30 minutes at 150° C. After cooling and venting, the resultant liquid was treated as in Example I. β-Perchloromethyl propionic acid, 74.5 parts, and 4.0 parts of a neutral fraction were obtained.

We can also employ catalytic amounts of palladium or other Group VIII metal-containing residues obtained as by-products in reactions wherein a Group VIII metal salt is reduced to the metal. For example, we can employ the palladium-metal containing residues obtained as by-products in the processes of Dubeck et al. application, Ser. No. 316,517, filed Oct. 16, 1963, now abandoned. Both Dubeck et al. processes are non-catalytic methods for the preparation of β-halo acid halides, e.g., β-chloropropionyl chloride. One process comprises the reaction of an olefin with carbon monoxide and a metal salt such as palladium chloride. The other process comprises the reaction of a preformed olefin metal halide complex, such as ethylene palladium chloride dimer, with carbon monoxide.

The utility of palladium-containing residues (afforded by other reactions) in our process is an important feature of this invention. Thus, our process can be integrated with other processes where, for example, palladium chloride is reduced. Conducting our process in conjunction with the second process affords a very economical use of palladium.

We have also discovered that our process is conveniently carried out by forming the metal catalyst in situ. For example, palladium chloride can be reduced by the olefin employed in our process to yield palladium metal. Additional olefin then reacts with carbon tetrachloride and carbon monoxide to form the acyl chloride. This reaction is catalyzed by the metal produced in the reduction step. The following example illustrates this embodiment of our invention.

*Example XIV*

An autoclave was charged with 640 parts of carbon tetrachloride, 145 parts of benzene, and 4 parts of palladium chloride. Carbon monoxide was added until a pressure of 2000 p.s.i.g. at 18° C. was attained. The mixture was stirred and heated to 148° C. The pressure was increased to 8500 p.s.i.g. with carbon monoxide. Propylene was added to increase the pressure to 8850 p.s.i.g. at 150° C. The pressure dropped to 8000 p.s.i.g. and was then elevated with additional propylene to 8425 p.s.i.g. After the pressure decreased to 8100 p.s.i.g., mode propylene was added to increase the pressure to 8700 p.s.i.g. When the pressure dropped to 8200 p.s.i.g., propylene was added to a pressure of 9530 p.s.i.g. The reaction mixture was maintained at this temperature and carried out for two and one-half additional hours at which time the pressure had decreased to 8750 p.s.i.g. The total reaction time was six hours and the total pressure decrease was 1700 p.s.i.g. The vessel was cooled, vented and discharged. The reaction mixture was filtered. A sample of the insoluble residue was submitted for analysis. It contained 11 percent palladium metal.

A total volume of 765 mls. of filtrate was obtained. A 615 ml. portion was reacted with excess methanol and yielded 122 grams of methyl ester. The ester comprised a mixture of methyl β-perchloromethyl butyrate and methyl 2-[2,2,2-trichloroethyl]propionate.

Twenty-five parts of the ester mixture was treated with 225 parts of concentrated sulfuric acid. The solution was stirred and heated to about 100° C. Vigorous evolution of hydrogen chloride occurred at this temperature. The evolution of gas had markedly decreased after three hours. Raising the temperature to 115° C. did not increase the rate of gas evolution. The reaction mixture was cooled, diluted with water, and extracted with ether in a continuous extractor for 20 hours.

The ether layer was separated and the ether removed by evaporation. Thirteen parts of acid was obtained. The acid was recrystallized three times from chloroform and methyl succinic acid, melting point 110–111.4° C., was obtained. The infrared spectrum was identical to a standard spectrum of methyl succinic acid.

Having fully described the novel process of this invention, the products produced thereby, and their utilities, we desire to be limited only within the lawful scope of the appended claims.

We claim:

1. A process for the preparation of β-perchloromethyl carboxylic acid halides, said process comprising reacting an olefin which is free of allylic halogen and acetylenic linkages with carbon monoxide and carbon tetrachloride in the presence of a catalytic amount of a Group VIII metal.

2. The process of claim 1 wherein said metal is iron.

3. The process of claim 1 wherein said metal is palladium.

4. A process for the preparation of β-perchloromethyl carboxylic acid chlorides, said process comprising reacting an olefin free of allylic halogen and acetylenic linkages and having a stable, unhindered, non-aromatic, non-conjugated double bond and having from 2 to about 12 carbon atoms, with carbon monoxide and carbon tetrachloride, in the presence of a catalytic amount of a Group VIII metal.

5. The process of claim 4 wherein said metal is iron.

6. The process of claim 4 wherein said metal is palladium.

7. The process of claim 4 wherein said metal is platinum.

8. A process for the preparation of β-perchloromethyl carboxylic acid chlorides, said process comprising reacting a straight-chain α-olefin free of allylic halogen and acetylenic linkages and having from 2 to about 6 carbon atoms with carbon monoxide and carbon tetrachloride, in the presence of a catalytic amount of a Group VIII metal.

9. A process for the preparation of β-perchloromethyl carboxylic acid chlorides, said process comprising contacting carbon tetrachloride with a straight-chain α-olefin free of allylic halogen and acetylenic linkages and having from 2 to about 6 carbon atoms and with carbon monoxide, in the proportion of from about 3 to about 10 moles of carbon monoxide per mole of olefin, in the presence of a catalytic amount of a Group VIII metal.

10. The process of claim 9 conducted in the vapor phase.

11. A process for the preparation of β-perchloromethyl propionyl chloride, said process comprising contacting ethylene, carbon monoxide and carbon tetrachloride in the presence of a catalytic amount of a Group VIII metal at a temperature from about 100° to about 300° C.

12. A process for the preparation of β-perchloromethyl carboxylic acid chlorides, said process comprising contacting carbon tetrachloride with a straight-chain α-olefin free of allylic halogen and acetylenic linkages and having from 2 to about 6 carbon atoms and carbon monoxide, in the proportion of from about 3 to about 10 moles of carbon monoxide per mole of olefin, in the presence of a catalytic amount of a Group VIII metal, at a temperature from about 100° to about 300° C. and at a pressure from about 100 to about 10,000 p.s.i.

13. The process of claim 12 conducted in the presence of a liquid phase.

14. The process of claim 12 conducted in the presence of liquid carbon tetrachloride.

15. The process of claim 12 conducted in the presence of liquid carbon tetrachloride and an inert organic liquid.

16. The process of claim 12 wherein the Group VIII metal is dispersed on an inert carrier.

17. The process of claim 12 wherein the temperature is from about 125° to about 160° C.

18. The process of claim 12 wherein said olefin is ethylene.

19. The process of claim 18 wherein said Group VIII metal is iron.

20. The process of claim 18 wherein said Group VIII metal is platinum.

21. The process of claim 18 wherein said Group VIII metal is palladium.

22. The process of claim 21 wherein the palladium is dispersed on an inert carrier selected from charcoal and alumina.

References Cited

UNITED STATES PATENTS

| | | | |
|---|---|---|---|
| 2,680,763 | 6/1954 | Brubaker | 260—544 X |
| 3,065,242 | 11/1962 | Alderson et al. | 260—544 X |
| 3,119,861 | 1/1964 | Blackham | 260—544 |

OTHER REFERENCES

Bennett, "Chem. Rev.," vol. 62, pp. 611–652 (1962) (pages 626–627 relied on).

1,138,760, October 1962, Germany (Jacobsen et al.) (5 pp. Spec. No drawing.) 260—486.

LORRAINE A. WEINBERGER, *Primary Examiner.*

R. K. JACKSON, *Examiner.*

V. GARNER, *Assistant Examiner.*